US010370873B2

(12) United States Patent
McIntosh

(10) Patent No.: US 10,370,873 B2
(45) Date of Patent: Aug. 6, 2019

(54) LUGGAGE IDENTIFICATION SYSTEM AND APPARATUS

(76) Inventor: Frederick G. McIntosh, Chattanooga, TN (US)

( * ) Notice: Subject to any disclaimer, the term of this patent is extended or adjusted under 35 U.S.C. 154(b) by 0 days.

(21) Appl. No.: 12/706,342

(22) Filed: Feb. 16, 2010

(65) Prior Publication Data

US 2010/0325060 A1 Dec. 23, 2010

Related U.S. Application Data

(60) Provisional application No. 61/269,163, filed on Jun. 22, 2009.

(51) Int. Cl.
| G06Q 10/08 | (2012.01) |
| E05B 67/38 | (2006.01) |
| H01M 10/48 | (2006.01) |
| H01M 10/46 | (2006.01) |

(52) U.S. Cl.
CPC .......... *E05B 67/383* (2013.01); *G06Q 10/08* (2013.01); *G06Q 10/0833* (2013.01); *H01M 10/48* (2013.01); *H01M 10/46* (2013.01); *Y10T 70/5058* (2015.04)

(58) Field of Classification Search
USPC ....... 280/655; 340/539.13, 573.1; 455/456.1; 424/435
See application file for complete search history.

(56) References Cited

U.S. PATENT DOCUMENTS

| 6,304,183 | B1* | 10/2001 | Causey ..................... 340/572.1 |
| 6,698,653 | B1* | 3/2004 | Diamond ........... G07C 9/00087 235/375 |
| 7,345,578 | B2* | 3/2008 | Holt et al. ................. 340/309.7 |
| 7,845,569 | B1* | 12/2010 | Warther ................ G06K 19/04 235/375 |
| 2006/0111123 | A1* | 5/2006 | Nerat ......................... 455/456.1 |
| 2007/0007751 | A1* | 1/2007 | Dayton et al. ................ 280/655 |
| 2007/0152826 | A1* | 7/2007 | August ............... A01K 11/004 340/572.1 |
| 2008/0129488 | A1* | 6/2008 | Hill .......................... 340/539.13 |

OTHER PUBLICATIONS

Stellin, Susan. New York Times, Late Edition (East Coast); New York, N.Y. [New York, N.Y]Dec. 22, 2002: 5.2. (Year: 2002).*

* cited by examiner

*Primary Examiner* — Andrew B Whitaker
(74) *Attorney, Agent, or Firm* — Stephen J. Stark; Miller & Martin PLLC

(57) ABSTRACT

An electronic baggage tracking device replaces the tracking sticker presently applied to baggage. The device has a display which at least selectively displays destination indicia such as a barcode identifying a particular destination airport location. The device also has the ability to store traveler identification information, which is preferably at least partially encrypted, as well as travel information which may not normally be provided with baggage indicia, such as departing and arrival times. The device is preferably connected to baggage, if not integrally, then with a housing which connects to handles such as with a top having depending sides which cooperate with a displaceable bottom. Once installed, the device preferably has a locking configuration thereby preventing inadvertent or undesired removal of the device.

19 Claims, 2 Drawing Sheets

LUGGAGE IDENTIFICATION SYSTEM AND APPARATUS

CLAIM OF PRIORITY

This application claims the benefit of U.S. Provisional Patent Application No. 61/269,163 filed Jun. 22, 2009.

FIELD OF THE INVENTION

The present invention relates to a luggage identification system in which information can be stored electronically and connected by means of a device which stores electronic information and is directly to luggage, and more particularly, to a luggage handle accessory which stores flight information, travel information, traveler information and possibly other information in which the information is provided to the device and then stored while preferentially displaying information for use by the airline and coordinating the proper handling of the baggage to its desired destination.

BACKGROUND OF THE INVENTION

E-tickets have matured significantly over the past few years. Not only can a passenger book travel arrangements utilizing the interne to create an electronic ticket, but an electronic version of an electronic ticket can now even be provided to a cell phone or personal data assistant for use in providing this information to a transportation provider such as airline at check in or other location. Accordingly, in some instances, there is no need for paper of any kind to be associated with a traveling passenger. See www.tsa.gov/press/releases/2009/1209.shtm.

Luggage identification which is separate from the passenger travel information provided by e-tickets has not seen such a revolution in technological advances. The most common way of identifying luggage in today's airline industry is to adhere a sticker directly onto the luggage. The sticker possibly identifies the owner of the luggage or at least a reference number to be assigned to the owner with a corresponding number which is provided to the traveler's ticket so that the luggage can be identified with the traveler at baggage claim. This sticker also normally has a bar code and a destination which identifies where the luggage is traveling in a one-way direction.

With the common sticker baggage identification, there is not a convenient way to identify multiple flights. The stickers could then become confused as to which destination the baggage is ultimately traveling. Furthermore, there is no way for the customer to perform self baggage checks as the baggage must be processed at the counter utilizing the current system.

Accordingly, improvements over these prior art baggage identification systems and devices are believed to be necessary.

SUMMARY OF THE INVENTION

Accordingly, it is a present object of the present invention to provide an improved electronic luggage tracking system and devices It is another object of at least some embodiments of the present invention to provide an improved electronic luggage tracking device which connects to articles of luggage.

It is another object of some embodiments of the present invention to provide a device which connects to luggage and is capable of receiving and at least temporarily storing electronic data.

It is another object of the present invention to provide an electronic device which in the presently preferred embodiment connects to an article of luggage and displays indicia such as a scannable image related to the intended destination of the baggage.

The device preferably securely connects to a portion of the luggage such as on a luggage handle. In the preferred embodiment, a slide is utilized to cooperate with one or more side slots in a housing and then preferably lock in place thereby securing the device with its electronics to the luggage. By having multiple side slots, various dimension handles can be accommodated.

The electronic components preferably provide a port which can communicate with a laptop computer, smart phone or other device. A processor can communicate through the port to preferably provide information related to a luggage bar code or other indicia into the electronics which can then be displayed on a screen on the device so that a luggage can be quickly scanned. Accordingly, instead of having to issue a luggage sticker, the luggage information can be pre-provided by the traveler and be ready for quick use by the airline system.

Additionally, other electronic information such as travel information, photographs and/or personal information could be included on the electronic device preferably encoded with a code provided only to the airlines and appropriate security personnel. The display of the device may also be utilized to provide a video providing instructions for its use, advertising, etc. The device may also include a microphone as well as a speaker for assisting in recording information and providing information Media may be played or recorded. A scroll button may be preferably provided to assist a user in scrolling information on the display. The port is preferably a UBS port but could be other ports such as are known in the art. One or more destinations may be provided and/or stored within the device along with personal information, travel information and/or other information.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
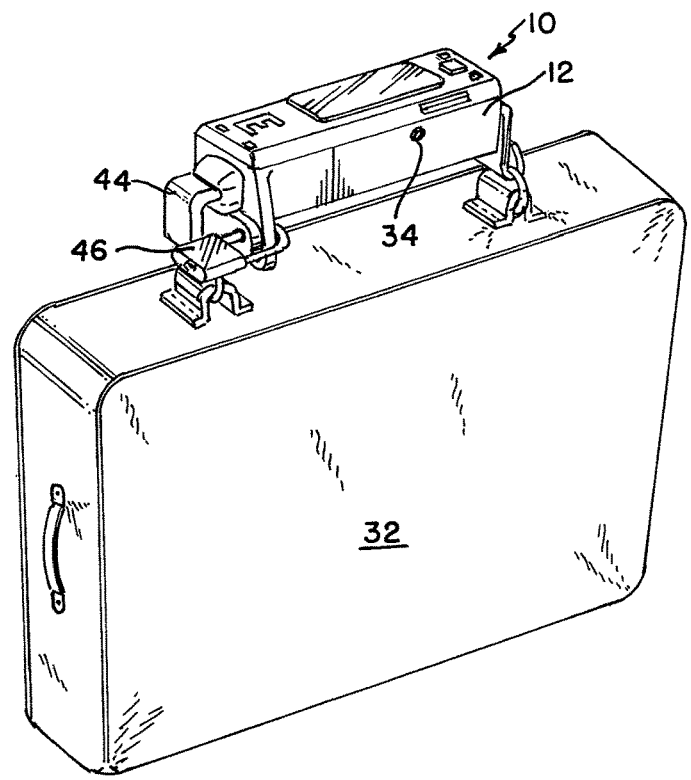
FIG. 1 shows a top perspective view of the luggage device of a presently preferred embodiment of the present invention installed on a handle of luggage.

FIG. 1 shows a baggage identifier 10 in the form of a luggage identification device. The luggage identification device or identifier 10 is preferably comprised of a housing 12 which may be one or more pieces. The preferred embodiment housing 12 is comprised of a top 14, sides 16,18 and bottom 20 as will be explained in further detail below. At least one of the sides 16,18 may preferably have a plurality of slots 22,24 while the other side 18 may have at least one slot 26 if not a plurality of slots 26 which may correspond to and/or cooperate with the similar positions on side 18 as well as the side 16. The bottom 20 may be made in the form of a slide which is received within slots such as 22,24 and/or 26. Bottom 20 preferably is provided as a slide 28 thus can be received in a respective slot 22, 24, 26 and/or others.

The luggage identification preferably has a display 30 which can display a bar code and/or text corresponding to a destination or the luggage 32 to which the luggage identification device 10 is connected. LCD or other displays 30 may function satisfactorily. One or more operators 34 such as a sliding toggle switch may be utilized to be pushed inward to power on the display 30. Other operators 34 may provide power on and/or power off. Furthermore, the toggle may be adjustable in any or all of the directions illustrated to be able to adjust to select items displayed on the display 30 so that various functions can be accomplished. By depressing the toggle or operator 34, a selection may be made. Other operators 34 may function differently. Furthermore, more than one operator 34 may be provided which would be understood by those of ordinary skill in the art.

Processor 38 is preferably operated coupled to operator 34, port 36 and/or display 30. Furthermore, speaker/microphone 40 may be found in some embodiments as well as camera/video recorder 42 in various other embodiments also, preferably coupled to processor 38 and/or data storage which may be integral to or separated from processor 38

In the preferred operation, the slide 28 is removed from housing 12. The remainder of the housing 12 can then be positioned relative to a handle 44 connected to luggage 32 and the slide 28 installed thereby securing the identifier to the handle 44. With the slide installed, lock 46 may be utilized to prevent the slide 28 from being released. Slide 28 may also be provided with a friction fit or other system to assist in releasing slide 28 to sides 22,24 and/or 26.

The user may connect a computer or other device such as through port 36 to a processor 38 to upload information which would include preferably information related to one or more sets of data. The data would preferably include at least a portion of flight information which could then be displayed on display 30 such as in the form of bar codes and/or other indicia. Furthermore, the information could also include information about the traveler such as name, height, weight and possibly could include a photograph, voice recognition sample and/or other information about the passenger. The personal information may be encrypted so that an unauthorized individual accessing information could only access some, if any of this information. However, a key as provided with a ticket purchase may be used with the electronic baggage information, and therefore, the airline and the passenger would have a key to decode this information therefore preventing unauthorized security breaches to others. TSA or other security department could be provided with a key as well.

The display 30 may also display the identification information related to the travel service provider such as a particular airline, cruise provider, etc. By allowing information to be provided into the device 10, a user can upload information regarding his or her flight(s) and include baggage information such as could be utilized to facilitate remote initial check in of baggage as well as the individual.

At the airport, a transportation provider may potentially weigh the luggage if the service provider elected to do so and process the luggage 32 through security if the provider elected to do so. The passenger information, baggage information, and/or the travel information would already be uploaded into the device 10. The display 30 could have the necessary information to cooperate with the travel service provider such as a bar code reader so that the baggage could be tracked.

In the preferred embodiment, there is no wireless capability, however, various embodiments could have various features such including wireless features in future generations. By not providing wireless capability in an initial version, there is no concern with airlines about having a wireless device possibly operating while the airplane is in flight.

The controller 34 may be utilized to at least assist in providing animated video on display 30 such as instructions as to how to utilize the device 10. Additionally, speakers could be employed to provide audio instructions, possibly in combination with the video on display 30.

Operator(s) 34 may be utilized to select the screen color and/or resolution on display 30 in various modes such as in a settings mode. Other "settings" could be adjustable in some embodiments. The operator(s) 34 may also be utilized to scroll and/or select such as by moving up, down, left, right and pushing in to select or otherwise. Furthermore, more than one operator 34 could be utilized and controllers 34 are known to those of ordinary skill in the art.

The port 36 could be a UBS port or other port which could be configured to cooperate with at least one of a computer such as a laptop, Smartphone, personal data assistant (PDA) or other device. Controller 34 may be also known to be useful to control the animation system icon, a video playback function, a video recording function such as could utilize the video camera recorder 42. The display 30 may also display a battery resolution and indicate battery charging or life status. Battery charging may be accomplished such as through port 36, and/or through the use of solar panels such as may be displayed towards the top 14 and/or sides 16.

Alternative operator(s) 34 could be in the form of a touch screen as are common with some laptop computers and personal data assistants and Smartphones. An aviation icon function could be provided as well as a sea icon function, a rail icon function, or a domestic bus icon function depending upon which of the various travel services are provided. Each of these icons may have differing or similar data capture depending upon the use of data by the various industries. Furthermore, if an alternative capability is determined, such as valet services of various kinds, hotel services or others are desiring to electronically track baggage whether now known or future about the device 10 of the presently preferred embodiment of the system is believed to be applicable and a new icon and/or upgrade could be loaded.

Display 30 may display a connection is made with port 36 as well as a battery life indicator and/or low battery indication. The display 30 may also be able to display flight information such as departure time, arrival time, delay time. Display 30 may also be controlled by the processor 38 otherwise display and indicia indicating the luggage may be lost under preset conditions such as if the operator 34 is not depressed following a predetermined established time of arrival. This may facilitate the location of lost luggage by airlines. Other lost luggage capabilities could also be provided. The display 30 may display in various languages based on cooperation with processor 38 and/or operators 34. Pre-check in capability may be provided. Digital voice enhancement, digital mapping, music downloading, video playing, screen locking, video tones and various other functions can be provided power on/power off may be controlled through the operator 34 or otherwise. It will be quickly seen that there is a large variety of uses and capabilities contemplated by the device 10.

The device 10 shown in the figures provides a housing 12 to which is preferably connected a communications port 36. The port 36 may be integral to the housing 12 and may include a female fitting for receiving a male fitting of a USB connector or be another type of port such as a wireless port in alternatively preferred embodiments of other port. Connected to the port 36 is a processor 38 which could also be connected to data storage 39 as would be understood by those of ordinary skill in the art. In fact, in other embodiments it may be possible that data storage 39 may include a removable storage data device such as an SD chip or other data storage device. The contemplated embodiment has a processor 38 with built in data storage 39 but those skilled in the art will understand that other embodiments may have other features and applications.

The housing has a display 30 which preferably is an LCD display but other displays as are known in the art could also be utilized. Display 30 is connected to the housing preferably at the top 14 but other locations could be selected for other embodiments. As can be seen in FIG. 1, the housing 10 is securely connected to an article of luggage. One will see that the device 10 in some embodiments may move when in this configuration relative to such articles as a handle 44 but in other embodiments, the connection may be non-moveable such as if the handle 44 is tightly grasped with other embodiments where the device 10 connects to a handle 44 or other portions of the luggage 32 in different ways. In fact, in still other embodiments, the device 10 can be integrally connected as portions of the luggage 32.

The device 10 provides various different modes which may work by themselves or in combination with other modes. For instance, there is a destination ticket mode in which the display 30 shows at least some indicia related to a destination on the display 30. This could be a bar code as is commonly utilized with baggage which would be at least temporarily displayed on the display. It is preferred that at least some destination indicia is displayed in a destination ticket mode which would correspond to the destination of the baggage, but possibly not all information in some embodiments.

The device 10 also preferably includes a capability to either provide and/or cooperate with a lock 46. The lock 46 would assist in typically securing the device 10 to the luggage 32 in a locked configuration. Said device 10 having an unlocked configuration such as with the lock 46 removed or otherwise provided from device 10 may be removed from the article of luggage perhaps after transitioning to a displaced configuration as will be described below.

The housing 10 may be provided with a top 14 with integral or otherwise provided depending sides 16,18. The bottom 20 is preferably displaceable such as by sliding as illustrated. Other bottoms could be hingedly connected or otherwise displaceable. In an operational configuration, access is defined in a passage 50 which receives the handle 44 such as illustrated in FIG. 1. Passage 50 is normally defined by the top 14, sides 16,18, bottom 20 when the bottom 20 is positioned in the operational configuration such as is shown in FIG. 1.

It is worth observing that the operational configuration puts the bottom 20 in its desired location retaining the housing 10 to the luggage 32. Operational configuration may or may not necessarily be the same configuration as a locked configuration and vise versa, but could share some common characteristics, as would be understood by those of ordinary skill in the art.

Figure 2:
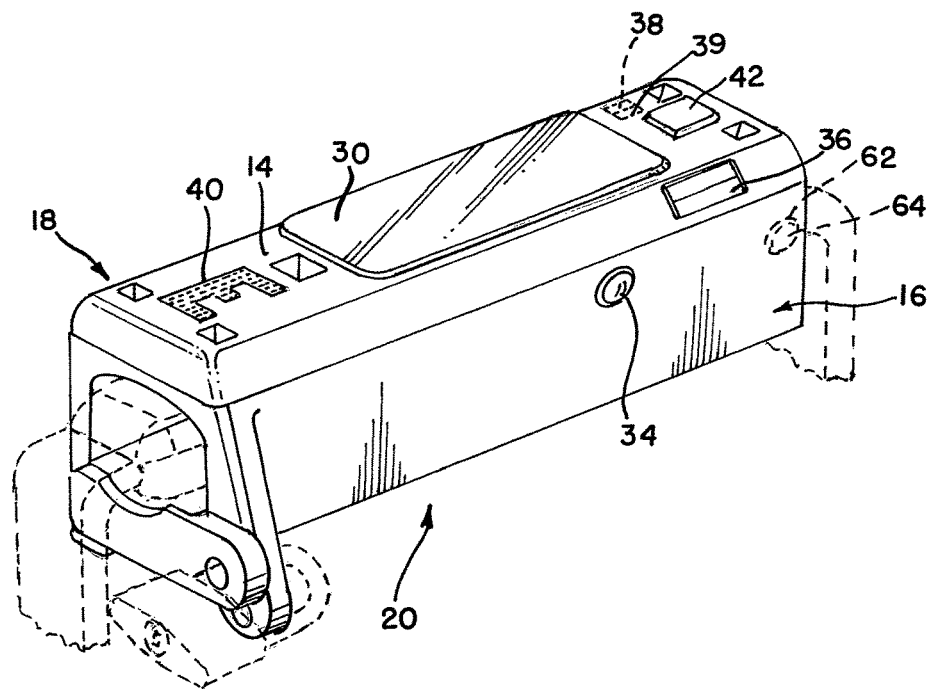
FIG. 2 shows a top perspective view of the device of FIG. 1 with the luggage in phantom.

For the embodied illustrated, the lock 46 must be removed from the housing 10 in order to achieve the displaced configuration as is shown in FIG. 2. This may not be required for other embodiments. Housing 10 may be buoyant and mode of any suitable material such as plastic and/or metal.

As can be seen from the images, cooperating slots 22, 24, 26 may be useful to slide the bottom 20 into pairs of the slots to retain the bottom 20 in position. In other embodiments, the slot 24 may not only coordinate with slot 22 and 26, but slot 26 may also cooperate with slot 24 to provide additional alternative connection capability as opposed to identically parallel slots as is shown in a preferred embodiment which also works well.

Accordingly, there is at least one additional slot in one of the sides 14,16 wherein the bottom 20 may be selectively connected with pairs of the slots whether slots 24,26, slots 22,26 or other pairs. As would be understood by those of ordinary skill in the art, use of various slots 22, 24, 26 with at least one different from another would provide at least two different cross sections for passage 50 defined by the bottom 20, sides 16,18 and top 14, with the bottom 20 is in an operational configuration.

In the illustrated embodiment, the bottom 20 has a lip 52 which cooperates with shoulder 54 which is connected on the sides 16,18. Shoulder 54 could connect to other portions of housing 12 other than bottom 20 in other embodiments. As can be understood from FIG. 1, the shoulder 54 preferably locks to the lip 52 in a locked configuration.

Figure 3:
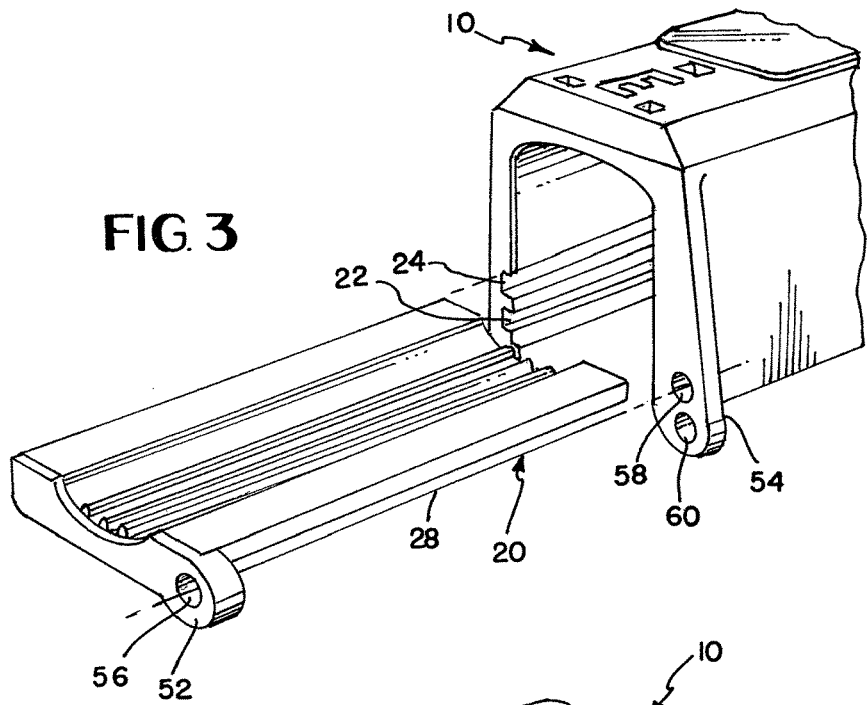
FIG. 3 shows an exploded view of a portion of the luggage device shown in FIG. 1.
Figure 4:
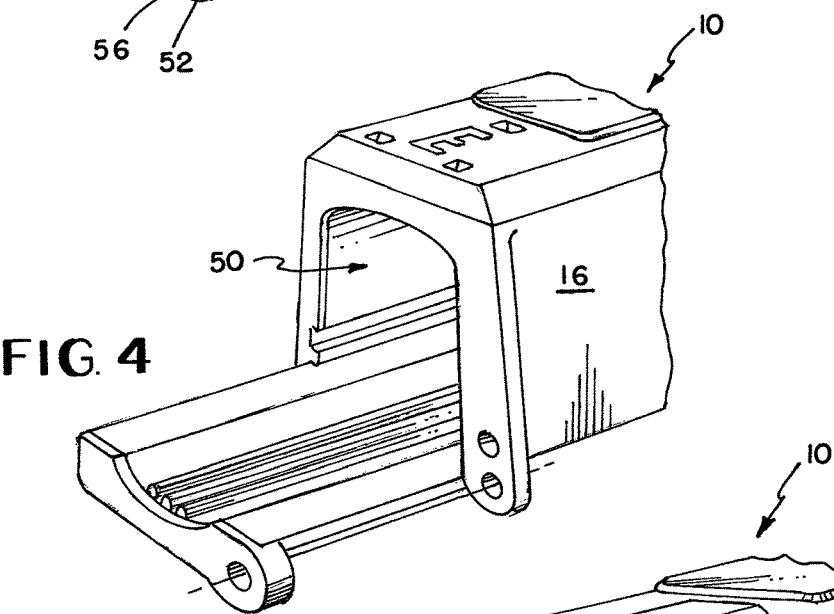
FIG. 4 shows a top perspective view of the portion of the luggage device shown in FIG. 1 in operatably assisted configuration.
Figure 5:
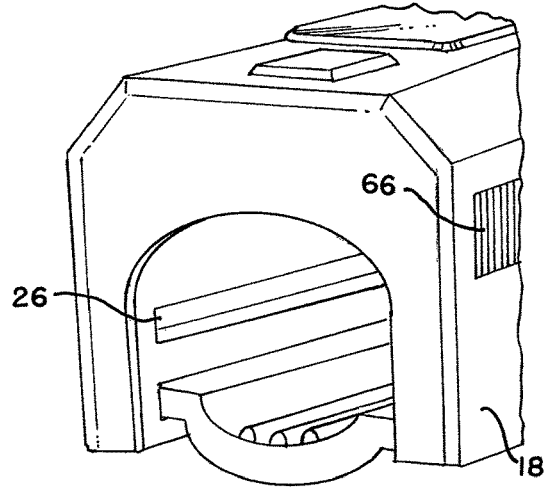
FIG. 5 shows an end perspective view of a portion of the luggage device shown in FIGS. 1-2.

The shoulder 54 and the lip 52 have cooperating bores 56,58 which can cooperate in a locked configuration such as illustrated in FIG. 1. It is also understood there is a second bore 60 partially obscured from view in FIG. 3 for which the bore 58 may also cooperate in the illustrated embodiment in the locked configuration.

Travel information can be displayed on the display 30 when provided to the device 10 such as through port 36. At least a portion of travel information can be selectively displayed on the display in travel identification mode. The travel identification mode may be selected by use of the operator 34 by selecting various items on the display 30. The operator 34 can be used to transition from various operational modes and/or simultaneously display some of the various modes.

Preferably at least some of the travel information is encrypted and may be accessed by those authorized parties such as the operator (i.e., the owner), service provider temporarily storing the baggage such as airlines, train company, cruise line, etc., and/or security agency such as TSA or other appropriate agency, governmental or private security agency or others in various modes and itinerary mode can be provided to display.

In addition to travel information and destination information, at least some travel information such as the departure time, the arrival time and other travel information. This information could be coordinated to a clock controlled by the processor 38 to provide a lost baggage warning indication for possibly lost baggage indication in a lost baggage mode.

In an image mode, the camera 42 may or may not be utilized to display an image on a display 30. The image(s) could be uploaded through port 36. Processor 38 could be coordinated to process images possibly in combination with internal data storage 39.

Camera 42 may be connected to the housing 12 such as integrally or otherwise and may assist in capturing at least one of video and still images and then having display 30 display the images in an image mode. This can be useful for visual identification of the operator or other uses such as a video recorder or a trip or other use. Speaker 40 is useful to record either voice possibly in combination with video through camera 42 and then be played back through speaker in a playback mode. Furthermore, there may be a playing mode in which recorded information could be provided through port 36 or otherwise input possibly storing in data storage 39 and/or processor 38 in a playing mode. A likeable voice may provide instructions, information, etc., and the languages may be selected from a plurality of selections.

The display 30 can be a double shielded screen so that it could be provided in a protected disposition. Information can be provided in the data storage such as city maps which could be displayed on display 30 in a map mode.

Visuals, photographs and/or media related to destinations could be provided on display in a destination mode or other mode. A digital compass could be provided on display 30 in a compass mode. A processor 38 could assist in analyzing room temperature in a temperature mode and display in a temperature mode. Display 30 could coordinate to provide time zones, country codes, timers in various modes. The display 30 could be back-lit and may have the brightness adjusted for the brightness of the room in some embodiments.

The housing 12 could take various forms from lightweight plastic to heavy-duty titanium. The display 30 could display animations in some mode. A virtual assistant could be provided for on-screen instructional use in some modes. Fingerprint identification could be coordinated through the display 30 and/or other inputs in some embodiments. Of course, internal battery compartment 62 having a battery 64 therein could be useful to provide energy, particularly in the event that the solar panels 66 are not provided with sufficient amount of solar energy to cover the needs of the device 10.

The device 10 is particularly useful for some new methods of business, particularly, the traveler can now self check baggage by providing information from the internet and which can include information related to a bar code to be displayed for the destination on the display 30. Furthermore, information could be exchanged with a service provider, to identify the baggage (a number of bags), flight information (flight number, departure time, arrival time etc.), destination information and traveler information, etc., can be provided through various modes to the device 10. All that would be left at the airport as it related to the baggage 32 could be to weigh it and pass it through security, at least in some embodiments. Furthermore, not only information may information be communicated to and from the internet, but the operator may also be able to download a portion of a website such as a page to the device 10 which could include My Space, Twitter, Facebook, or pages at other locations so that a positive identity of the traveler may be enhanced over above the type of information found on a luggage tag such as name and address and phone number.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of utilizing an electronic baggage identifying device comprising the steps of:
   providing a housing having a display,
   providing a communications port connected to the housing,
   providing a processor connected to the housing and in communication with the display and communications port;
   wherein said housing has a connected configuration whereby the housing is securely connected to an article of luggage;
   and wherein the device has a destination ticket mode displaying electronically a replacement for a luggage sticker, whereby at least some destination indicia related to a destination airport and an accompanying traveler is displayed on the display as an electronic luggage sticker in a format generated on behalf of a transportation provider and sent remotely to an accompanying traveler and as assigned with a ticket purchase for the traveler specifically to accompany the article of luggage for assisting in identifying the article of luggage to be associated with the accompanying traveler and the destination of the article of luggage in the destination ticket mode, said traveler loading the at least some destination indicia into the device remotely, and with the device connected to the article of luggage prior to checking in with the transportation provider and remotely loaded relative to the transportation provider with the at least some destination indicia in the destination ticket mode displayed in the format provided prior to the device being provided to the transportation provider pre-checked in with the housing in the connected configuration.

2. The method of utilizing the electronic baggage identifying device of claim 1 further comprising a lock, said lock operated by the traveler and assisting in physically securing the device to the luggage in a locked configuration, and said device having an unlocked configuration wherein the device may be removed from the article of luggage; and wherein the destination ticket mode displays the luggage sticker before the device is checked at the airport.

3. The method of utilizing the electronic baggage identifying device of claim 1 wherein the housing has a top with integral depending sides, and a displacing rigid bottom opposite the display, said displacing bottom providing an access in a displaced configuration to a passage which is normally defined by the top, sides and bottom when the bottom is in an operational configuration, and the passage receives a portion of the luggage therethrough in the connected configuration with at least the housing retaining the portion of the luggage in the passage and further comprising a lock, said lock assisting in physically securing the device to the luggage in a locked configuration with the bottom retained securely relative to the sides in the operational configuration by the lock, and said device having an unlocked configuration wherein the bottom may be moved to the displaced configuration allowing the device to be removed from the article of luggage.

4. The method of utilizing the electronic baggage identifying device of claim 3 wherein the lock is removed from the housing by the traveler in the displaced configuration.

5. The method of utilizing the electronic baggage identifying device of claim 3 wherein the sides have cooperating slots which slidingly receive a portion of the bottom in the operational configuration.

6. The method of utilizing the electronic baggage identifying device of claim 5 further comprising at least one additional slot in at least one of the sides wherein the bottom may be selectively connected with pairs of the slots in the sides to provide at least two different cross sections for passages in the operational configuration.

7. The method of utilizing the electronic baggage identifying device of claim 6 further comprising a lock, said lock assisting in physically securing the device to the luggage in a locked configuration with the bottom retained in the operational configuration within selected slots, and said device having an unlocked configuration wherein the bottom may be moved to the displaced configuration allowing the device to be removed from the article of luggage.

8. The method of utilizing the electronic baggage identifying device of claim 7 wherein the housing has a shoulder connected to one of the sides and the bottom has a lip, and the shoulder is locked to the lip in the locked configuration.

9. The method of utilizing the electronic baggage identifying device of claim 8 wherein the shoulder and lip have cooperating bores and wherein the lock has an arm which passes through the shoulder and the lip in the locked configuration.

10. The method of utilizing the electronic baggage identifying device of claim 1 in combination with a handle of luggage passing through a passageway of the housing in the connected configuration.

11. The method of utilizing the electronic baggage identifying device of claim 1 wherein passenger traveler information is provided to the device concurrently with the issuance of an e-ticket and at least a portion of the passenger traveler information is selectively displayed on the display in a code format in a traveler identification mode.

12. The method of utilizing the electronic baggage identifying device of claim 11 wherein at least some of the passenger traveler information is encrypted an accessible only by those parties selected from the group of the operator, the service provider temporarily storing the baggage, and security agencies.

13. The method of utilizing the electronic baggage identifying device of claim 1 further comprising at least some travel information including flight information provided to the device and at least a portion of the travel information is selectively displayed on the display in an itinerary mode; wherein the destination ticket mode is uploaded remotely from an airport and the article of luggage is remotely checked in before arriving at the airport.

14. The method of utilizing the electronic baggage identifying device of claim 1 further comprising an operator, said operator providing selection capability of at least some items displayed on the display thereby having the processor coordinate display of at least some additional information on the display, related to the traveler on a flight for which the article is accompanying.

15. The method of utilizing the electronic baggage identifying device of claim 1 further comprising a camera connected to the housing, said camera capturing at least one of video and still images and said display displaying the at least one of video and still images in an image mode.

16. The method of utilizing the electronic baggage identifying device of claim 1 further comprising a speaker said speaker coupled to the processor for playing of a recording in a playing mode.

17. The method of utilizing the electronic baggage identifying device of claim 16 further comprising a microphone connected to the display, said microphone coordinated to record a recording in a recording mode, with the device having a playback mode wherein the recording is played back in a playback mode through the speaker.

18. The method of utilizing the electronic baggage identifying device of claim 3 securely connected directly to a handle of luggage with the handle in the passage.

19. The method of utilizing the electronic baggage identifying device of claim 1 further comprising a solar panel secured to and on an exterior surface the housing which at least assists in providing electrical power to operate the processor and display.

* * * * *